US012739546B2

(12) United States Patent
Chen et al.

(10) Patent No.: US 12,739,546 B2
(45) Date of Patent: Sep. 15, 2026

(54) LOUDSPEAKER AND ELECTRONIC SYSTEM

(71) Applicant: GOERTEK INC., Weifang (CN)

(72) Inventors: Long Chen, Weifang (CN); Wenpu Li, Weifang (CN); Yurong Wang, Weifang (CN)

(73) Assignee: GOERTEK INC., Weifang (CN)

( * ) Notice: Subject to any disclaimer, the term of this patent is extended or adjusted under 35 U.S.C. 154(b) by 236 days.

(21) Appl. No.: 18/561,039

(22) PCT Filed: Aug. 24, 2021

(86) PCT No.: PCT/CN2021/114360
§ 371 (c)(1),
(2) Date: Nov. 15, 2023

(87) PCT Pub. No.: WO2023/272911
PCT Pub. Date: Jan. 5, 2023

(65) Prior Publication Data

US 2024/0276133 A1 Aug. 15, 2024

(30) Foreign Application Priority Data

Jun. 29, 2021 (CN) ........................ 202110731679.1

(51) Int. Cl.
*H04R 1/34* (2006.01)
*H04R 1/02* (2006.01)

(52) U.S. Cl.
CPC ............ *H04R 1/028* (2013.01); *H04R 1/026* (2013.01); *H04R 2201/025* (2013.01)

(58) Field of Classification Search
CPC .... H04R 1/02; H04R 1/021; H04R 2201/025; H04R 1/026; H04R 1/323; H04R 2499/15; G10K 11/004
See application file for complete search history.

(56) References Cited

U.S. PATENT DOCUMENTS

| | | | | |
|---|---|---|---|---|
| 4,764,960 A * | 8/1988 | Aoki | H04R 5/02 381/303 |
| 7,684,584 B2 * | 3/2010 | Hsu | H04R 1/025 381/387 |
| 8,189,849 B2 * | 5/2012 | Waddell | H04R 1/02 381/387 |

(Continued)

FOREIGN PATENT DOCUMENTS

| | | |
|---|---|---|
| CN | 202652503 U | 1/2013 |
| CN | 107222798 A | 9/2017 |

(Continued)

OTHER PUBLICATIONS

International Search Report from International Application No. PCT/CN2021/114360 mailed Mar. 28, 2022.

*Primary Examiner* — Ryan Robinson
(74) *Attorney, Agent, or Firm* — Shih IP Law Group, PLLC

(57) ABSTRACT

A loudspeaker and an electronic system are disclosed. The loudspeaker includes a base, a loudspeaker body and a first driver. The loudspeaker body is disposed on the base and defines an up and down direction of the loudspeaker, and the loudspeaker body is rotatable around the up and down direction with respect to the base. The first driver can drive the loudspeaker body to rotate with respect to the base.

9 Claims, 9 Drawing Sheets

(56) References Cited

U.S. PATENT DOCUMENTS

| | | | | |
|---|---|---|---|---|
| 10,178,470 | B2 * | 1/2019 | Watanabe | H04R 1/025 |
| 10,206,029 | B2 * | 2/2019 | Song | H04R 1/323 |
| 11,317,198 | B2 * | 4/2022 | Li | H04R 27/00 |
| 11,506,330 | B2 * | 11/2022 | Correa | F16M 11/22 |
| 2005/0035246 | A1 * | 2/2005 | Coleman | F16M 11/18<br>248/349.1 |
| 2018/0316843 | A1 * | 11/2018 | Guyot | F16M 11/14 |
| 2021/0397214 | A1 * | 12/2021 | Yamamoto | F16M 11/126 |

FOREIGN PATENT DOCUMENTS

| | | | | | |
|---|---|---|---|---|---|
| CN | 206658288 | U | * | 11/2017 | |
| CN | 108882067 | A | * | 11/2018 | H04R 1/02 |
| CN | 109040877 | A | * | 12/2018 | H04R 1/025 |
| CN | 208798172 | U | | 4/2019 | |
| CN | 209120382 | U | | 7/2019 | |
| CN | 209914007 | U | | 1/2020 | |
| CN | 110913307 | A | * | 3/2020 | H04R 1/323 |
| CN | 211128092 | U | | 7/2020 | |
| CN | 211152125 | U | | 7/2020 | |
| CN | 211152141 | U | | 7/2020 | |
| CN | 211656325 | U | | 10/2020 | |
| CN | 211779725 | U | | 10/2020 | |
| CN | 212137873 | U | | 12/2020 | |
| CN | 212543973 | U | | 2/2021 | |
| KR | 940001867 | Y1 | * | 3/1994 | H04R 1/323 |

* cited by examiner

LOUDSPEAKER AND ELECTRONIC SYSTEM

CROSS-REFERENCE TO RELATED APPLICATIONS

The present disclosure claims a priority to Chinese Patent Application No. 202110731679.1, entitled "loudspeaker and electronic system" filed with China Patent Office on Jun. 29, 2021, the entire contents of which are incorporated herein by reference.

TECHNICAL FIELD

The present disclosure relates to a technical field of loudspeaker products, and particularly, to a loudspeaker and an electronic system using the loudspeaker.

DESCRIPTION OF RELATED ART

Nowadays, with the development of electronic devices, loudspeakers have gradually entered everyone's home. However, some problems usually occur in use. For example, a screen or an operating panel on the loudspeaker is generally fixed, which makes it easy to affect the convenience of using the loudspeaker when it is not placed in position. Besides, sound produced by speakers in some loudspeakers also has relatively strong directivity, and thus, when the loudspeaker is not placed in place, it is easy to affect the playing effect of the loudspeaker.

SUMMARY

A main purpose of the present disclosure is to provide a loudspeaker, which aims to provide a mechanical structure basis that the loudspeaker body is rotatable with respect to the base, such that when one sidewall of the loudspeaker body is provided with a screen or an operating panel, an orientation of the screen or the operating panel can be adjusted by rotating the loudspeaker body to improve the convenience for using the loudspeaker; or when a speaker facing the sidewall is provided on the loudspeaker body, an orientation of the speaker can be adjusted by rotating the loudspeaker body to ensure the playing effect of the loudspeaker.

To achieve the above purpose, the loudspeaker proposed by the present disclosure includes:

- a base;
- a loudspeaker body disposed on the base and defining an up and down direction of the loudspeaker, wherein the loudspeaker body is rotatable around the up and down direction with respect to the base; and
- a first driver configured to drive the loudspeaker body to rotate with respect to the base.

In an embodiment of the present disclosure, the first driver includes:

- a first motor disposed on the loudspeaker body;
- a driving gear inserted with an output shaft of the first motor; and
- a driven gear inserted with the base and engaged with the driving gear, wherein an axis of the driven gear coincides with a rotation axis of the loudspeaker body, and the first motor drives the driving gear to rotate with respect to the driven gear so as to drive the loudspeaker body to rotate with respect to the base.

In an embodiment of the present disclosure, an installation tube is protruded from a surface of the base facing the loudspeaker body, and a projection of the installation tube to a projecting plane vertical to the up and down direction has a circular shape, and

- a rotating shaft is protruded from a surface of the loudspeaker body facing the base, the rotating shaft is rotatably inserted into the installation tube, and the driven gear is inserted with the installation tube.

In an embodiment of the present disclosure, a first installation space is formed in the loudspeaker body, and an extension hole connecting the first installation space is provided on the surface of the loudspeaker body facing the base, and

- the first motor is disposed in the first installation space, and an output shaft of the first motor passes through the extension hole.

In an embodiment of the present disclosure, the display screen is slidably provided on the loudspeaker body in the up and down direction, and the loudspeaker further includes a second driver configured to drive the display screen to slide with respect to the loudspeaker body.

In an embodiment of the present disclosure, the second driver includes:

- a second motor disposed on the loudspeaker body; and
- a transmission structure transmissively connected to the second motor and the display screen, wherein the second motor drives the display screen to slide with respect to the loudspeaker body by the transmission structure.

In an embodiment of the present disclosure, a second installation space is concavely formed on an outer circumferential surface of the loudspeaker body, and the second driver is disposed in the second installation space, and

- the display screen is connected to a connecting rod having one end away from the display screen extending into the second installation space to be connected to the second driver.

In an embodiment of the present disclosure, the loudspeaker body further has a sound cavity formed therein and an installation hole communicating to the sound cavity, and wherein the loudspeaker body is further provided with a speaker having a part extending into the sound cavity via the installation hole,

- the loudspeaker further includes an inner casing covering the loudspeaker body, wherein the inner casing has an exposing hole provided at a position corresponding to the installation hole, a first avoiding hole provided at a position corresponding to the second installation space, and a guide groove provided at a position of an outer circumferential surface of the inner casing adjacent to the avoiding hole, wherein the guide groove and the first avoiding hole are opened and extended in the up and down direction, and
- the one end of the connecting rod away from the display screen extends into the second installation space via the first avoiding hole, and wherein the connecting rod further has a guide block slidably inserted into the guide groove in the up and down direction.

In an embodiment of the present disclosure, the loudspeaker further includes an outer casing including:

- a lower casing provided with a lower cavity having an opening upward, wherein the base is disposed in the lower cavity; and
- an upper casing provided with an upper cavity having an opening downward, wherein the upper casing covers the inner casing, and a lower surface of the upper casing is connected to an upper surface of the lower casing, and wherein the upper casing has a plurality of sound holes provided at a position thereof corresponding to the exposing hole, and a second avoiding hole provided at a position thereof corresponding to the first avoiding hole, wherein the second avoiding hole is opened and extended in the up and down direction, and the one end of the connecting rod away from the display screen extends into the first avoiding hole via the second avoiding hole.

The present disclosure also proposes an electronic system including a loudspeaker, the loudspeaker includes:

a base;

a loudspeaker body disposed on the base and defining an up and down direction of the loudspeaker, wherein the loudspeaker body is rotatable around the up and down direction with respect to the base; and a first driver configured to drive the loudspeaker body to rotate with respect to the base.

According to the technical solution of the disclosure, during use of the loudspeaker, the first driver may drive the loudspeaker body to rotate with respect to the base, such that a sidewall of the loudspeaker body may be adjusted to face users in different directions. On the basis of this mechanical structure, when one sidewall of the loudspeaker body is provided with a screen or an operating panel, the first driver 30 may drive the loudspeaker body to rotate, such that the screen or the operating panel on the loudspeaker body face the position of the user, which is convenient for the user to watch the screen on the loudspeaker body or to operate the operating panel, thereby improving e the convenience for using the loudspeaker. When a speaker facing the sidewall is provided on the loudspeaker body, the first driver may drive the loudspeaker body to rotate so as to make the speaker on the loudspeaker body face the position of the user, which is convenient for the speaker on the loudspeaker body to produce and play sound toward the user better, thereby ensuring the playing effect of the loudspeaker.

Besides, as the loudspeaker body of the loudspeaker is rotatably disposed on the base, the first driver is located at a lower end of the loudspeaker. Thus, a center of gravity of the loudspeaker may be lowered, thereby improving the stability of the placement of the loudspeaker.

BRIEF DESCRIPTION OF DRAWINGS

In order to illustrate the technical solutions in the embodiments of the present disclosure or the prior art more clearly, the drawings required to be used in the content of the embodiments or the prior art will be introduced briefly as following. Obviously, the drawings in the following description are merely several embodiments of the present disclosure, and for those of ordinary skill in the art, other drawings can also be obtained from the structure illustrated in these drawings without any creative effort.

Figure 1:
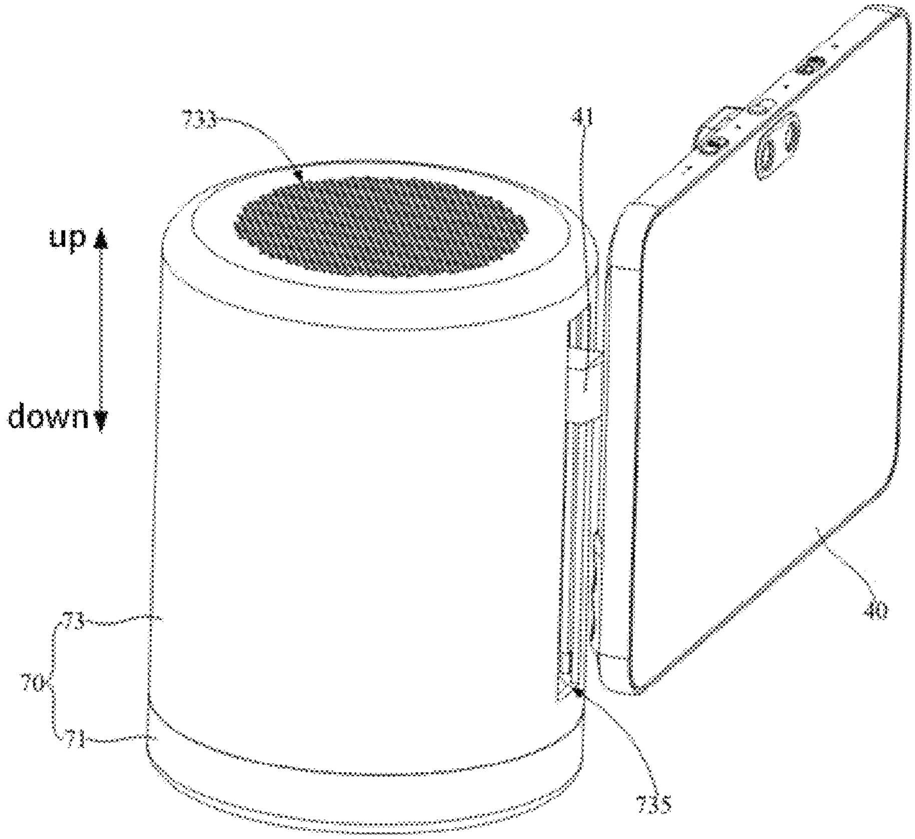
FIG. 1 is a diagram of an assembly structure of a loudspeaker of an embodiment of the present disclosure.
Figure 2:
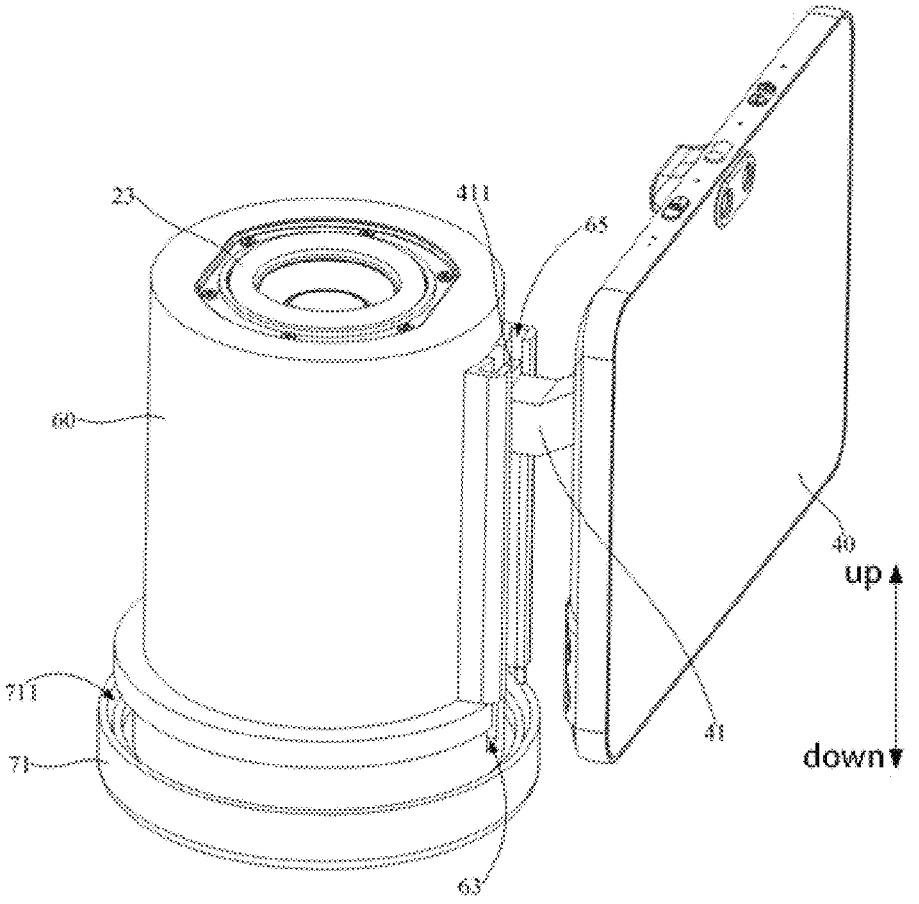
FIG. 2 is a diagram of a partial structure of the loudspeaker in FIG. 1.

Introduction of reference number:

| Reference number | names | Reference number | names |
|---|---|---|---|
| 10 | base | 40 | display screen |
| 11 | installation tube | 41 | connecting rod |
| 20 | loudspeaker body | 411 | guide block |
| 21 | sound cavity | 50 | second driver |
| 22 | installation hole | 51 | second motor |
| 23 | speaker | 53 | transmission structure |
| 24 | rotating shaft | 531 | driving wheel |
| 241 | bearing | 533 | driven wheel |
| 25 | first installation space | 535 | belt |
| 26 | extension hole | 60 | inner casing |
| 27 | box | 61 | exposing hole |
| 28 | cover | 63 | first avoiding hole |
| 29 | second installation space | 65 | guide groove |
| 291 | upper segment | 70 | outer casing |
| 293 | lower segment | 71 | lower casing |
| 30 | first driver | 711 | lower cavity |
| 31 | first motor | 73 | upper casing |
| 33 | driving gear | 731 | upper cavity |
| 35 | driven gear | 733 | sound hole |
| 351 | flange | 735 | second avoiding hole |
| 353 | limiting ring | | |

The achievement of the object, functional features and advantages of the present disclosure will be further described with reference to the drawing in combination with the embodiments.

DETAILED DESCRIPTIONS

The technical solution in the embodiments of the present disclosure will be described clearly and completely as following in combination with the drawings in the embodiments of the present disclosure. Obviously, the described embodiments are only a part of the embodiments of the present disclosure, but not all of the embodiments. Based on the embodiments of the present disclosure, all other embodiments obtained by those ordinary skilled in the art without creative labor fall within the protection scope of the present disclosure.

It should be noted that all directional indications (such as up, down, left, right, front, back, etc.) in embodiments of the present disclosure are only used to explain the relative position relationship and motion situation between the components in a specific gesture (as shown in the drawing). If the specific gesture changes, the directional indication will also change accordingly.

In the present disclosure, unless specific provision and definition otherwise, the terms “connect”, “fix”, etc. shall be understood in a broad sense, for example, “fix” may be a fixed connection, a detachable connection, or integrated; it can be mechanical connection, or it can be electrical connection; it can be directly connected, or it can be indirectly connected by an intermediate medium, and it can be a connection inside two components or an interaction between two components, unless specific definition otherwise. For those ordinary skilled in the art, the specific meaning of the above terms in the present disclosure may be understood according to specific circumstances.

In addition, the descriptions related to “first”, “second”, etc. in the present disclosure are only used for purpose of illustration and cannot be understood as indicating or implying their relative importance or implying the number of indicated technical features. Therefore, the feature defined by "first" and "second" may explicitly or implicitly includes at least one of the features. In addition, the technical solutions of respective embodiments can be combined with each other but should be based on that those ordinary skilled in the art can achieve the solutions. When the combination of technical solutions is contradictory or cannot be realized, it shall be considered that such combination of technical solutions does not exist and is not within the scope of protection required by the present disclosure.

The present disclosure provides a loudspeaker.

Referring to FIGS. 1, 4, 6 and 8, in an embodiment of the present disclosure, the loudspeaker includes a base 10, a loudspeaker body 20 and a first driver 30. Among them, the loudspeaker body 20 is disposed on the base 10 and defines an up and down direction of the loudspeaker (in a placement state that the loudspeaker is in normal use). The loudspeaker body 20 is rotatable around the up and down direction with respect to the base 10, and the first driver 30 can drive the loudspeaker body 20 to rotate with respect to the base 10.

In an embodiment of the present disclosure, the base 10 may carry components such as the loudspeaker body 20 and the first driver 30, such that the components of the loudspeaker can be assembled as a whole. Meanwhile, when the loudspeaker is in normal use and is thus positioned on a supporting surface (for example, a table surface or a cabinet surface, etc.), a lower surface of the base 10 may be placed to abut against the supporting surface. Here, a projection of the base 10 on a horizontal plane may have a circular shape, such that its shape may be more regular and thus convenient to be machined. Of course, in other embodiments, the projection of the base 10 on the horizontal plane may also have a square shape, a triangular shape or other shape. The base 10 may be formed in a plate-like structure, such that the volume of the base 10 may be relatively smaller and thus facilitate reducing the overall volume of the loudspeaker. Of course, in other embodiments, the base 10 may also be a frame structure enclosed by a plurality of plates or a plurality of columns. In other words, the present disclosure does not limit the shape and formation of the base 10, as long as it can carry the components such as the loudspeaker body 20 and the first driver 30. The loudspeaker body 20 may play music or other voice information for the user to listen to. Here, a projection of the loudspeaker body 20 on the horizontal plane may have a circular shape, such that its shape may be more regular and thus convenient to be machined, and at the same time, its volume may be relatively smaller and thus facilitate reducing the overall volume of the loudspeaker. Of course, in other embodiments, the projection of the loudspeaker body 20 on the horizontal plane may also have a square shape, a triangular shape or other shape. In addition, the specific structure of the loudspeaker body 20 may be as follows: referring to FIGS. 4 and 8, the loudspeaker body 20 is formed with a sound cavity 21 therein and is provided with an installation hole 22 communicating with the sound cavity 21. Meanwhile, the loudspeaker body 20 is also provided with a speaker 23, and a part of the speaker 23 extends into the sound cavity 21 via the installation hole 22. Since the sound producing principle of the speaker 23 is well-known, the specific structure thereof is not detailed herein. The speaker 23 may be installed on the loudspeaker body 20 by screws or fasteners, etc., to simplify the installation process of the speaker 23 on the loudspeaker body 20. The rotatable connection between the loudspeaker body 20 and the base 10 may be achieved by providing one of the loudspeaker body 20 or the base 10 with a rotating shaft and the other one with a rotating hole and inserting the rotating shaft into the rotating hole. Of course, when the base 10 has a relatively larger projection area on the horizontal plane and the loudspeaker body 20 has a relatively smaller projection area on the horizontal plane, the loudspeaker body 20 may be directly provided as a circular structure and be rotatably inserted into the base 10, as long as it can achieve the rotation of the loudspeaker body 20 around the up and down direction with respect to the base 10. Further, a screen or an operating panel may be formed on the loudspeaker body 20. The first driver 30 may provide power to drive the loudspeaker body 20 to rotate, such that the screen and the operating panel on the loudspeaker body 20 or the speaker in the loudspeaker body 20 may be directed towards the user. Here, the first driver 30 may be disposed on the base 10, and of course, it may also be disposed on the loudspeaker body 20.

According to the technical solution of the disclosure, during use of the loudspeaker, the first driver 30 may drive the loudspeaker body 20 to rotate with respect to the base 10, such that one sidewall of the loudspeaker body 20 may be adjusted to face users in different directions. On the basis of this mechanical structure, when one sidewall of the loudspeaker body 20 is provided with a screen or an operating panel, the first driver 30 may drive the loudspeaker body 20 to rotate, such that the screen or the operating panel on the loudspeaker body 20 faces the position of the user, which is convenient for the user to watch the screen on the loudspeaker body 20 or to operate the operation panel, thereby improving the convenience to use the loudspeaker. When a speaker facing the sidewall is provided on the loudspeaker body 20, the first driver 30 may drive the loudspeaker body 20 to rotate, to make the speaker on the loudspeaker body 20 face the position of the user, which is convenient for the speaker on the loudspeaker body 20 to produce and play sound to the user better, thereby ensuring the playing effect of the loudspeaker.

Moreover, since the loudspeaker body 20 and the display screen 40 of the loudspeaker are rotatably disposed on the base 10 as a whole, the first driver 30 is located at a lower end of the loudspeaker. Thus, a center of gravity of the loudspeaker may be lowered, thereby improving the stability of the placement of the loudspeaker.

Referring to FIGS. 4, 6, 8 and 9, in an embodiment of the present disclosure, the first driver 30 includes a first motor 31, a driving gear 33 and a driven gear 35. The first motor 31 is disposed on the loudspeaker body 20. The driving gear 33 is inserted with an output shaft of the first motor 31. The driven gear 35 is inserted with the base 10 and is engaged with the driving gear 33. An axis of the driven gear 35 also coincides with a rotation axis 24 of the loudspeaker body 20. The first motor 31 drives the driving gear 33 to rotate with respect to the driven gear 35 so as to drive the loudspeaker body 20 to rotate with respect to the base 10.

It can be understood that when the base 10 is seated on the supporting surface, the base 10 may be limited and fixed with respect to the supporting surface under an action of the gravity of the loudspeaker. Thus, the driven gear 35 disposed on the base 10 is also limited and fixed. In this case, when the first motor 31 drives the driving gear 33 to rotate, the driving gear 33 may move along a circumferential direction of the driven gear 35 to make the loudspeaker body 20 to rotate with respect to the base 10. The first driver 30 includes the first motor 31, the driving gear 33 and the driven gear 35, such that the loudspeaker body 20 may be controlled to have a relatively suitable rotation speed, by adjusting a transmission ratio of the driving gear 33 to the driven gear 35. For example, since there is a deceleration effect when the transmission ratio of the gears is greater than 1, and the transmission ratio is equal to the inverse of the ratio of a diameter of the driving gear 33 to a diameter of the driven gear 35, the diameter of the driving gear 33 may be set less than the diameter of the driven gear 35. Thus, the rotation speed of the driven loudspeaker body 20 is reduced such that the rotation speed thereof is easy to control, which may avoid the loudspeaker body 20 from being driven to rotate too fast to cause the loudspeaker body 20 to accurately rotate to the position of the user. Meanwhile, such setting may also have the first motor 31 and the rotating parts of the base 10 and the loudspeaker body 20 disposed side by side in the horizontal direction. Thus, an overall height of the loudspeaker may be reduced and the position of the center of gravity may thus be lowered, thereby improving the stability of the placement of the loudspeaker on the supporting surface. Of course, it should be noted that the present disclosure is not limited thereto, and in other embodiments, the first motor 31 may also be disposed on the base 10. In this case, the driven gear 35 is inserted with the loudspeaker body 20, and the axis of the driven gear 35 coincides with the rotation axis 24 of the loudspeaker body 20. Alternatively, the first driver 30 may only include a first motor 31 which is disposed on the base 10. Thus, the loudspeaker body 20 is directly connected to an output shaft of the first motor 31 and is directly driven by the first motor 31.

Referring to FIGS. 6, 7, 8 and 9, in an embodiment of the present disclosure, an installation tube 11 is protruded from a surface of the base 10 facing the loudspeaker body 20, and a projection of the installation tube 11 to a projection plane vertical to the up and down direction has a circular shape. A rotating shaft is protruded from a surface of the loudspeaker body 20 facing the base 10, the rotating shaft 24 is rotatably inserted into the installation tube 11, and the driven gear 35 is inserted with the installation tube 11.

It can be understood that the installation tube 11 is protruded from the base 10, and an inner space of the installation tube 11 forms a rotating hole rotatably fitted with the rotating shaft 24, such that a thickness of the base 10 may be disposed relatively thin, thereby facilitating further reducing the overall volume of the base 10, and thus reducing the raw materials for required manufacture as well as manufacturing costs. Meanwhile, the driven gear 35 may also be directly fitted around the installation tube 11 on the outside. In this case, a volume of the installation tube 11 itself is relatively small, so that a volume of the driven gear 35 may also be disposed relatively small, thereby facilitating reducing the occupied space thereof to improve the convenience of installation of the driven gear 35 so as to reduce the overall volume of the loudspeaker. In other words, the disposition of the installation tube 11 on the base 10 functions to fix the loudspeaker body 20, and also functions to fix the driven gear 25. Thus, there is no need to separately provide, on the base 10, respective connection structures for fixing the loudspeaker body 20 and the driven gear. In this case, the structure of the base 10 is simplified, which facilitates improvement of the convenience of manufacture and reduction of the manufacturing cost. Here, the driven gear 35 and the installation tube 11 may be connected by interference fit, and of course, may also be connected by keys, snaps or screws. When the driven gear 35 is connected to the installation tube 11 by the screws, an upper end of the driven gear 35 may be extended towards the installation tube 11 to form a flange 351 abutting against an upper surface of the installation tube 11, so that it is more convenient to insert the screw into the installation tube 11 from top to bottom through the flange 351 and fasten it. Further, in order to improve stability and smoothness of the rotatable connection between the rotating shaft 24 and the installation tube 11, a bearing 241 may be inserted with the rotating shaft 24 by interference fit, the bearing 241 is rotatably fitted with the installation tube 11 to realize an indirect rotatable connection between the rotating shaft 24 and the installation tube 11. In order to improve the stability of the installation of the bearing 241, the bearing 241 may be accommodated in the installation tube 11, an upper surface of the flange 351 of the driven gear 35 is connected to a limiting ring 353, and a part of the limiting ring 353 abuts against an upper surface of the outer ring of the bearing 241. Thus, the bearing 241 is clamped and limited by cooperation of the limiting ring 353 and the installation tube 11 in the up and down direction. Here, screws may sequentially pass through the limiting ring 353 and the flange 351 on the driven gear 35 and be inserted into the installation tube 11, thereby achieving one-step fixation of the three components to improve the installation efficiency. Of course, it should be noted that the present disclosure is not limited thereto. In other embodiments, when the base 10 has a circular shape, the driven gear 35 may also be directly fitted around the base 10 at the outside, and in this case, the first motor 31 is also disposed on an outer circumferential surface of the loudspeaker body 20 correspondingly.

Referring to FIGS. 6, 7, 8 and 9, in an embodiment of the present disclosure, a first installation space 25 is formed in the loudspeaker body 20, and an extension hole 26 communicating with the first installation space 25 is provided on a surface of loudspeaker body 20 facing the base 10. The first motor 31 is disposed in the first installation space 25, and an output shaft of the first motor 31 passes through the extension hole 26.

It can be understood that the first installation space 25 provides an accommodation space for the first motor 31, through which the first installation space 25 may accommodate the first motor 31. Thus, the first motor 31 may be installed more compactly on the loudspeaker body 20, which facilitates further reduction of the overall volume of the loudspeaker. Meanwhile, the first motor 31 is provided in the loudspeaker body 20, and the first motor 31 may be isolated and protected by the first installation space 25. That is, it may facilitate hiding the first motor 31, which may reduce the possibility of the first motor 31 being damaged by foreign objects to facilitate extending the lifespan of the first motor 31, and at the same time, be also convenient to ensure the aesthetic appearance of the loudspeaker to improve the competitiveness of the product in the market. Moreover, when the first motor 31 is provided in the loudspeaker body 20, the thickness of the base 10 may also be reduced, such that the volume of the base 10 may also be provided relatively small. Here, referring to FIGS. 4. 8 and 9, the loudspeaker body 20 may include a box 27 and a cover 28. In this case, the loudspeaker body 27 is also formed with a sound cavity 21 therein, and is provided with an installation hole 22, and the speaker 23 is disposed on the box 27. The cover 28 is connected to a lower surface of the box 27 and enclose together with the box 27 to form a first installation space 25, and a rotating shaft 24 is protruded from a surface of the cover 28 away from the box 27. In this way, the box 27 and cover 28 enclose to form the first installation space 25, such that the box 27 and cover 28 can be provided independently, and then assembled as a whole and directly enclose to form the first installation space 25. The structures of the box 27 and the cover 8 are simpler than the integrated structure of the loudspeaker body 20, which can facilitate their respective processing and manufacturing, thereby improving the convenience of forming the first installation space 25. Here, only the box 27 may be recessed locally and enclose together with the cover 28 to form the first installation space 25, or only the cover 28 may be recessed locally and enclose together with the box 27 to form the first installation space 25, or both of the box 27 and the cover 28 may be recessed locally and enclose to form the first installation space 25. The box 27 and the cover 28 may be connected by screws or fasteners so as to simplify the connection structure thereof and improve the installation efficiency. In addition, it should be noted that the present disclosure is not limited thereto. In other embodiments, when both of the rotating shaft 24 and the installation tube 11 have certain heights, the first motor 31 may be installed directly on a lower surface of the loudspeaker body 20, or the lower surface of the loudspeaker body 20 may be recessed directly to form a groove for accommodating the first motor 31.

Figure 3:
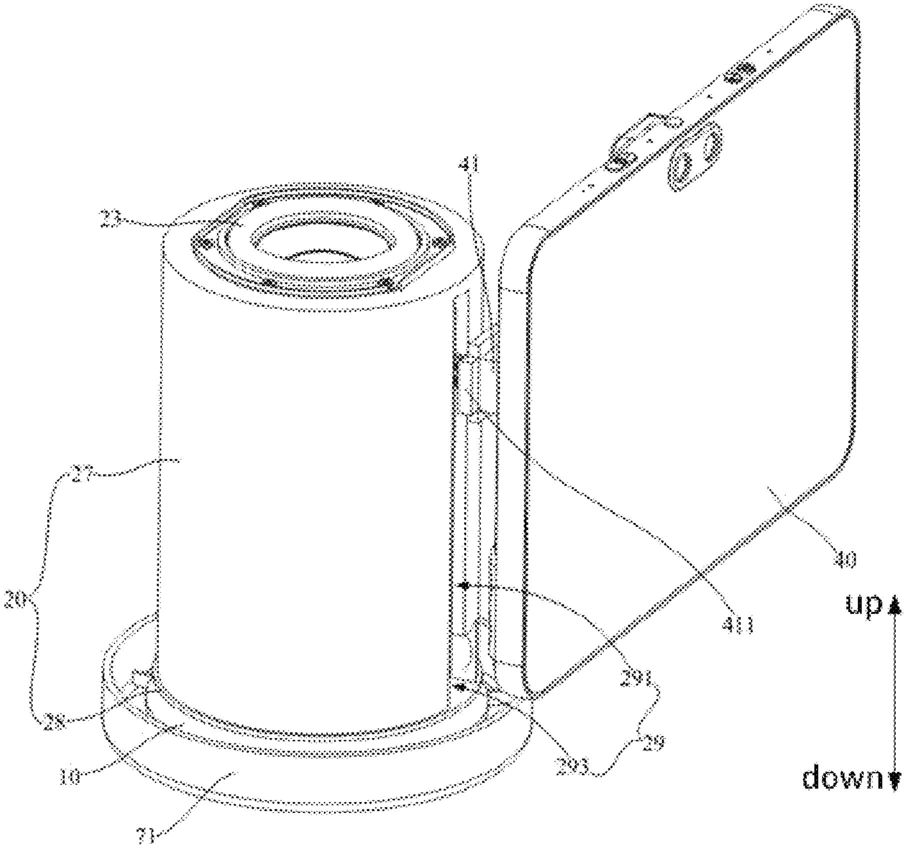
FIG. 3 is a diagram of another partial structure of the loudspeaker in FIG. 1.
Figure 4:
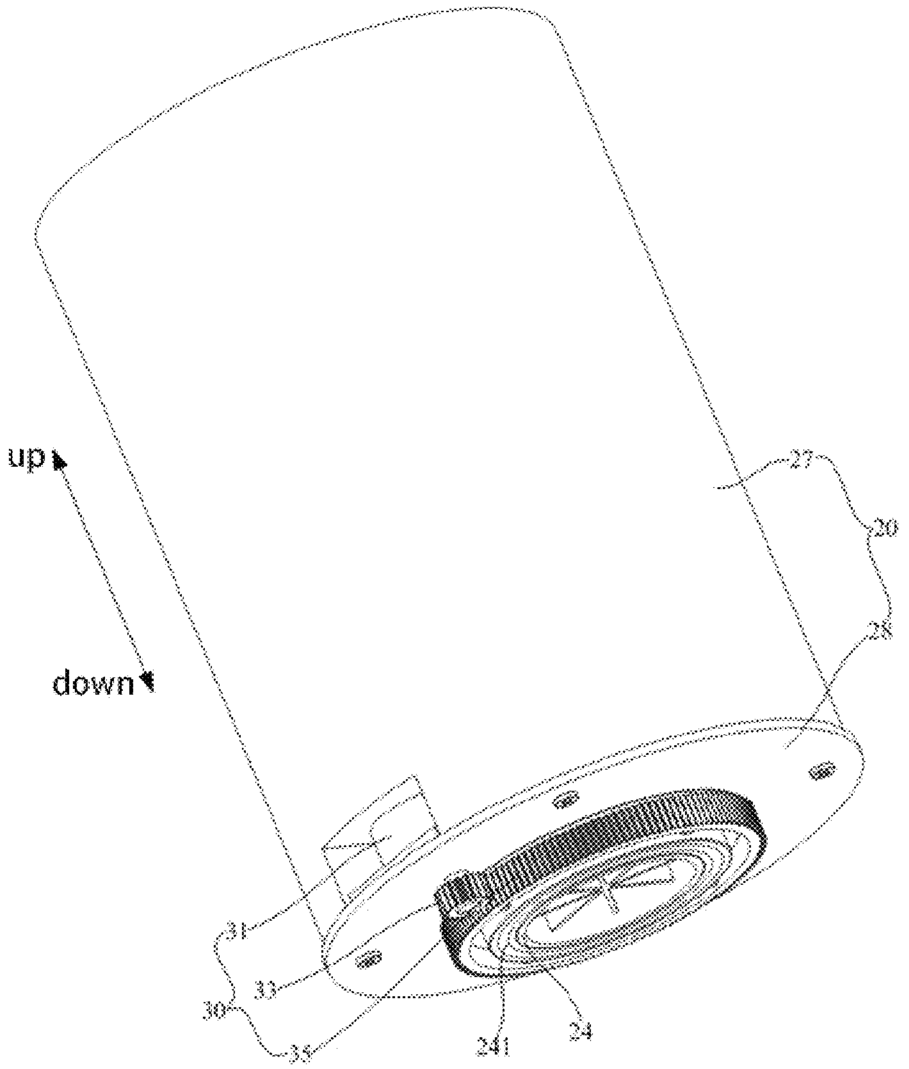
FIG. 4 is a diagram of another partial structure of the loudspeaker in FIG. 1.
Figure 5:
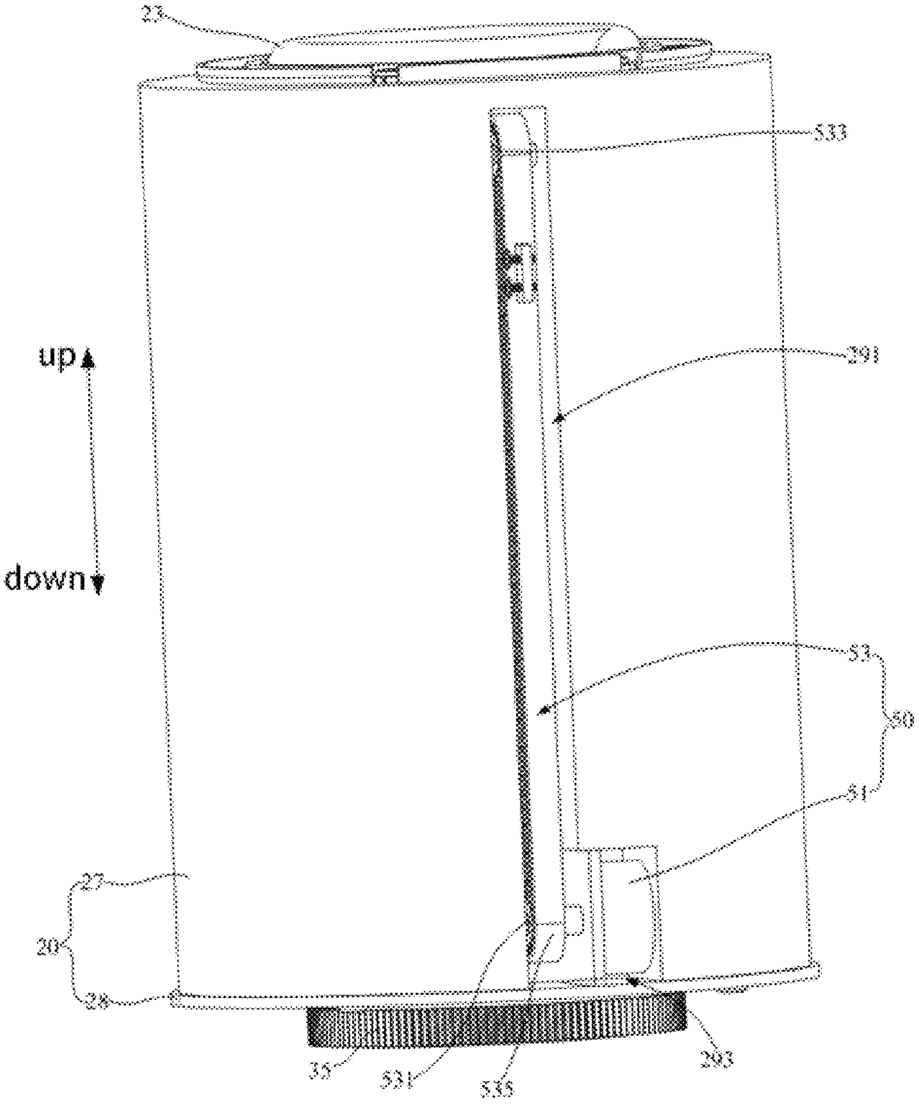
FIG. 5 is a diagram of another partial structure of the loudspeaker in FIG. 1.
Figure 8:
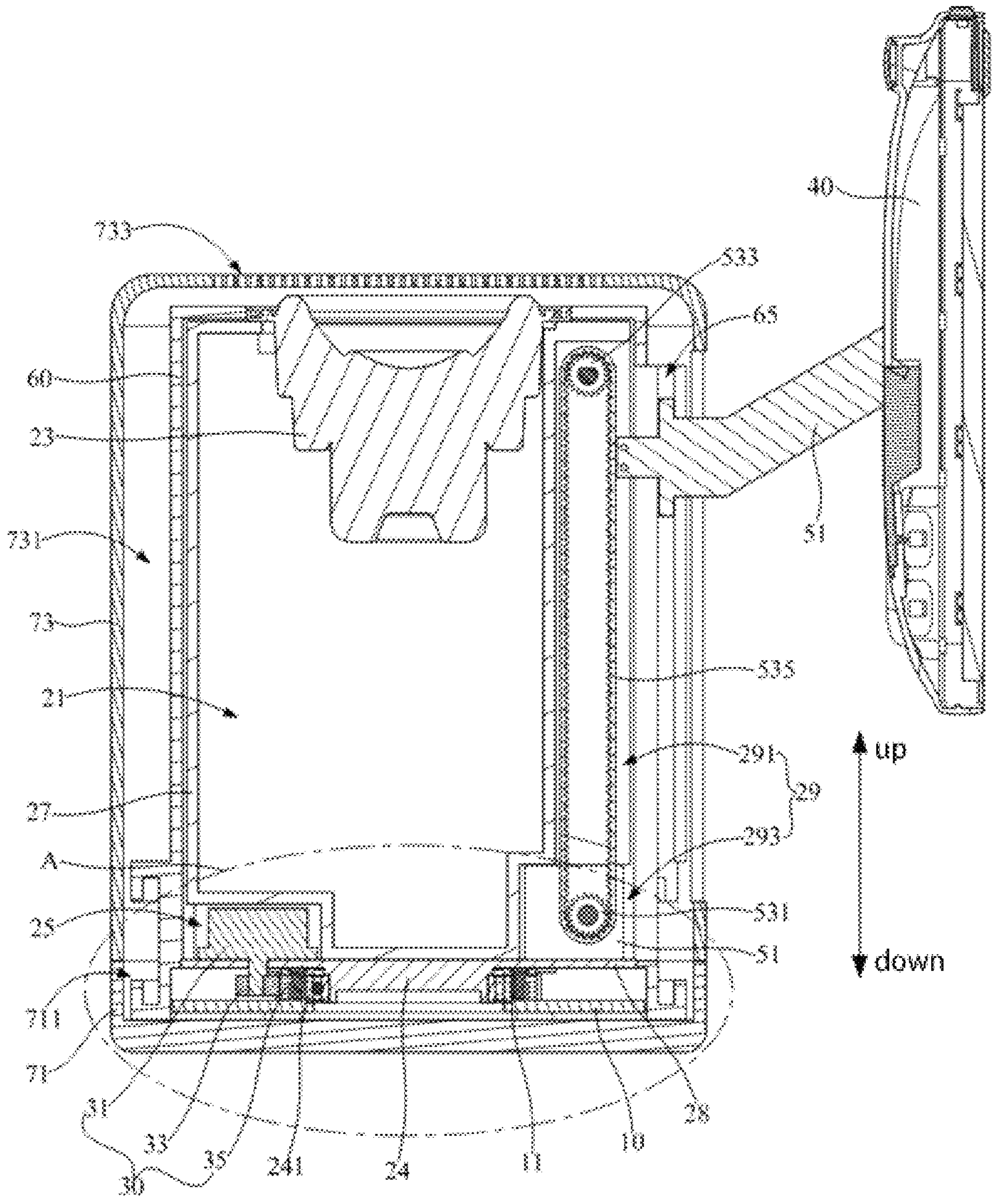
FIG. 8 is a cross sectional view of the loudspeaker in FIG. 1.
Figure 9:
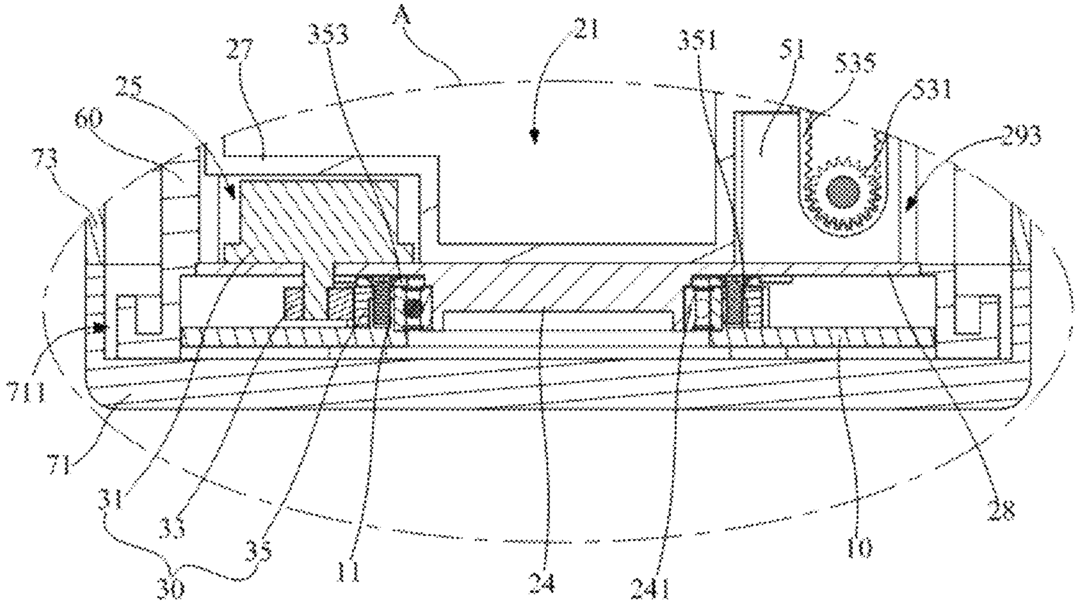
FIG. 9 is a partial enlarged diagram at a position of A in FIG. 8.

Referring to FIGS. 3, 5 and 8, in an embodiment of the present disclosure, the loudspeaker also includes a display screen 40 which is slidably provided in the loudspeaker body 20 in the up and down direction, and the loudspeaker also includes a second driver 50 which can drive the display screen 40 to slide with respect to the loudspeaker body 20.

It can be understood that the display screen 40 additionally disposed on the loudspeaker body 20 can make the loudspeaker body 20 have a relatively large display area, which is more convenient for the user to watch. Moreover, as the display screen 40 is disposed on the loudspeaker body 20, the first driver 30 may drive the loudspeaker body 20 to rotate and thus drive the display screen 40 to a view angle for better watching due to relatively facing the user's current position, when the user is in different positions. Here, the display screen 40 may be a screen with only display function. Of course, the display screen 40 may also be a touch screen, which is convenient for the user to directly perform a touch operation for, such as, playing on-demand songs, watching movies or doing online shopping, on the display screen 40. Further, the display screen 40 may also be provided with a microphone and a camera, which is convenient for the user to interact with the loudspeaker by the microphone using voice or capture and recognize the user's location by the camera to achieve an effect of tracking the user. In this case, the camera may be electrically connected to the first driver 30 and the second driver 50, and transmit the detected signal to the first driver 30 and the second driver 50 after recognition of the specific position of the user, such that the first driver 30 stops driving the loudspeaker body 20 in time and the second driver 50 stops driving the display screen 40 in time, thereby limiting the display screen 40 to be accurately located in a position relatively facing the user. In addition, the display screen 40 and the loudspeaker body 20 may be directly connected. Of course, they also may be indirectly connected by a connector. Further, the second driver 50 drives the display screen 40 to slide up and down with respect to the loudspeaker body 20, such that the position of the display screen 40 can also be adjusted in the up and down direction. That is, the diversification of the movement of the display screen 40 is improved, thereby more conveniently and accurately adjusting the display screen 40 to the user's current position to be adapted and thus making the user have a better view angle for watching.

Figure 6:
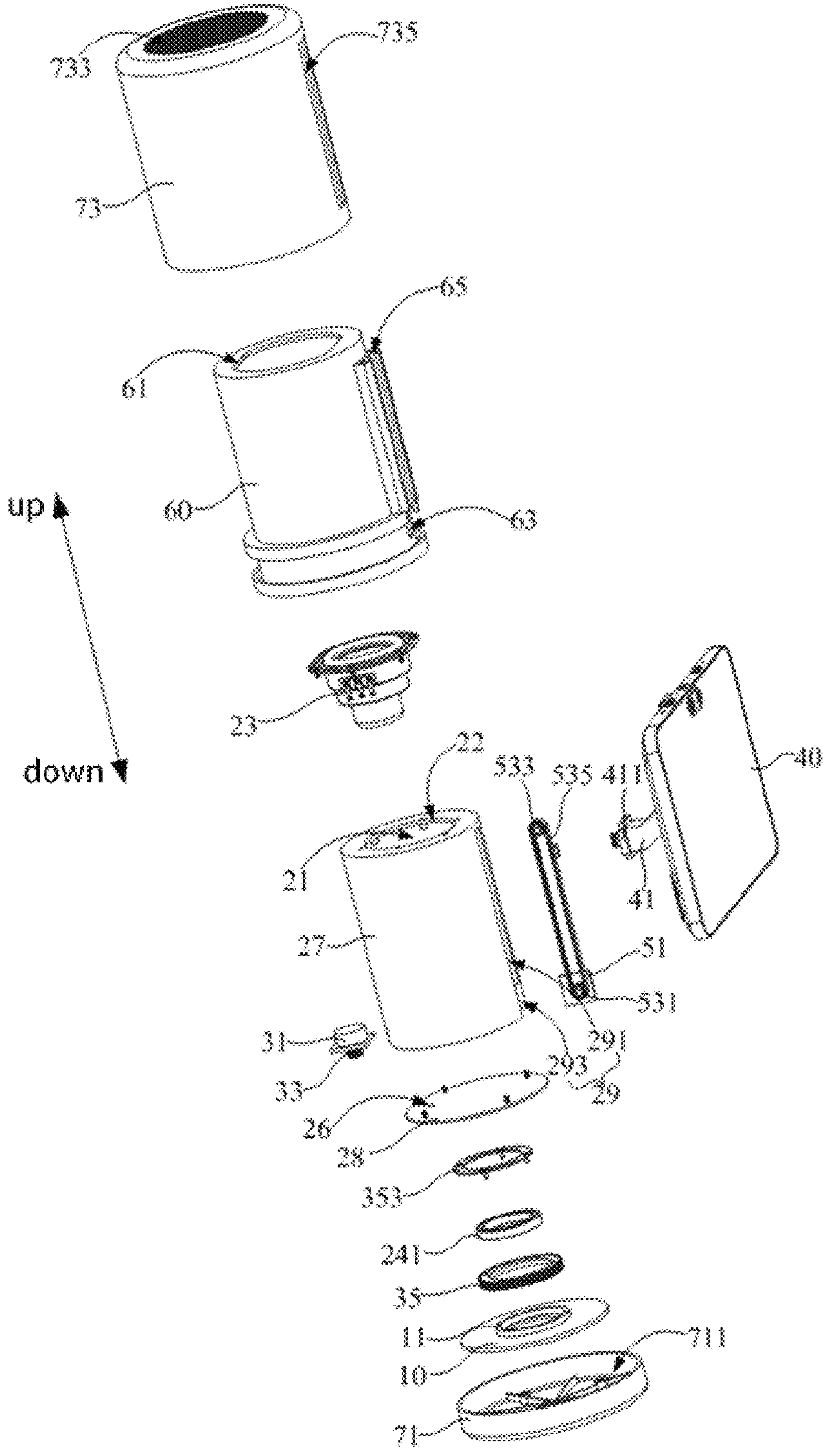
FIG. 6 is a diagram of an explosion structure of the loudspeaker in FIG. 1 in one view.
Figure 7:
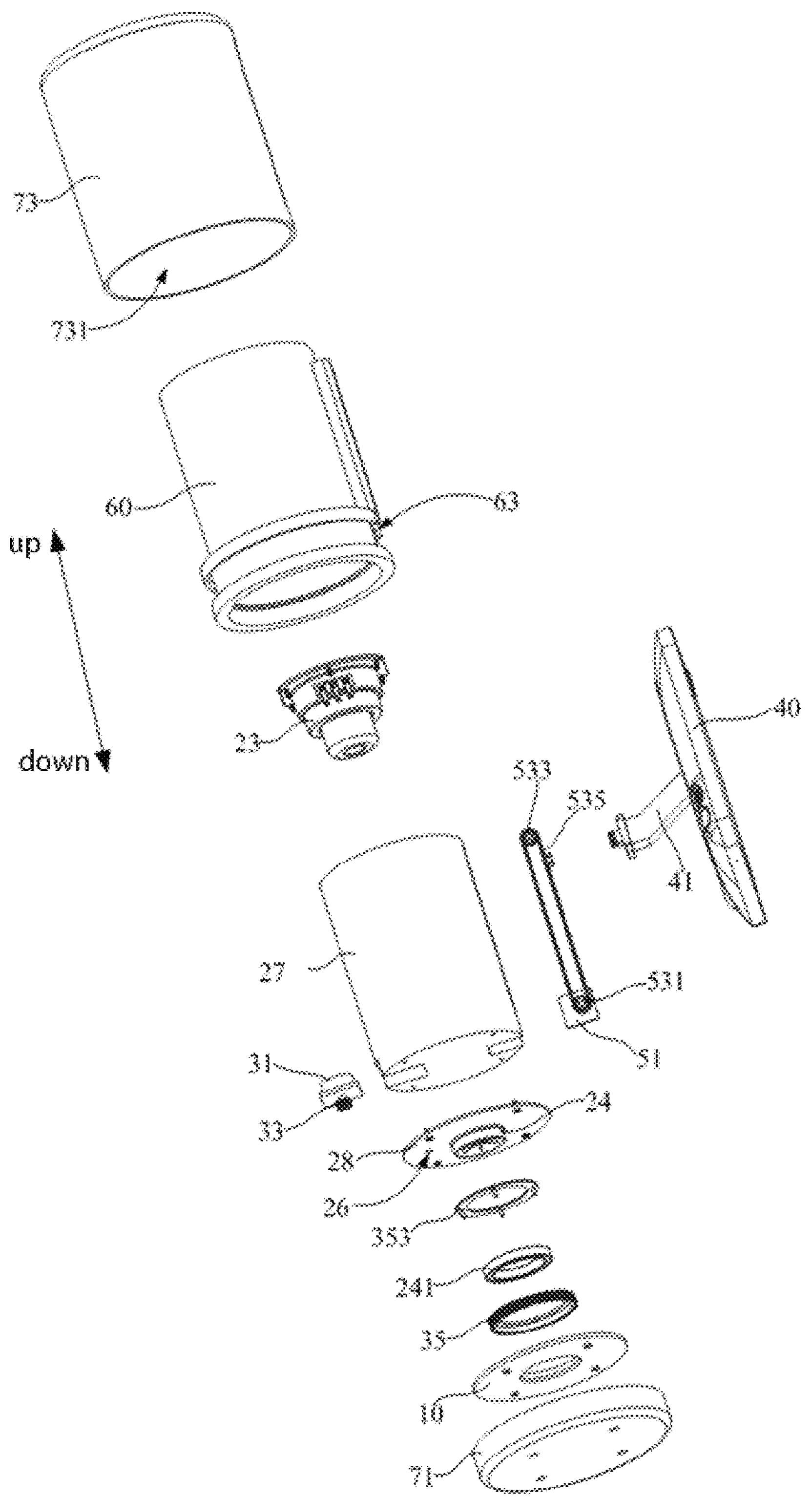
FIG. 7 is a diagram of the explosion structure of the loudspeaker in FIG. 1 in another view.

Referring to FIGS. 5, 6, and 8, in an embodiment of the present disclosure, the second driving element 50 includes a second motor 51 and a transmission structure 53. The second motor 51 is disposed on the loudspeaker body 20. The transmission structure 53 is transmissively connected to the second motor 51 and the display screen 40. The second motor 51 drives the display screen 40 to slide with respect to the loudspeaker body 20 through the transmission structure 53.

It can be understood that the rotating motion of the second motor 51 may be converted into a linear motion of the display screen 40 in the up and down direction by the transmission structure, such that the second driver 50 may not be expanded and contracted in the up and down direction. Thus, there is no need to dispose a sliding space for sliding the second driver 50 on the loudspeaker body 20, which facilitates further reduction of the overall volume of the loudspeaker. Of course, it should be noted that the present disclosure is not limited thereto, and in other embodiments, the second drive element 50 may also be just a cylinder or a linear module, etc.

Referring to FIGS. 5, 6 and 8, in an embodiment of the present disclosure, the transmission structure 53 includes a driving wheel 531, a driven wheel 533 and a belt 535. The driving wheel 531 is inserted with an output shaft of the second motor 51. The driven wheel 533 is rotatably disposed on the loudspeaker body 20 and is spaced apart from the driving wheel 531 in the up and down direction. The belt 535 is inserted with the drive wheel 531 and the drive wheel 533, and the display screen 40 is connected to the belt 535.

It can be understood that, as the belt 535 has elasticity, it can absorb the impact and the vibration such that the transmission structure 53 may have smooth transmission and reduced noise when driving the display screen 40 to slide in the up and down direction, thereby reducing noise interference and ensuring the playing effect when the loudspeaker plays music. Here, side circumferential surfaces of both the driving wheel 531 and the driven wheel 533 may be arc surfaces. Of course, side circumferential surfaces of both the driving wheel 531 and the driven wheel 533 may also be provided with convex teeth, and the belt 535 is provided with corresponding convex teeth engaged thereto, thus further improving the stability of driving of the driving wheel 531. In addition, it should be noted that the present disclosure is not limited thereto, and in other embodiments, the transmission structure may also include a lead screw and a slide seat. In this case, the lead screw is rotatably disposed on the loudspeaker body 20 and extended in the up and down direction, and one end of the lead screw is also connected to an output shaft of the second motor 51. The slide seat is inserted with the lead screw, and the display screen 40 is connected to the slide seat. Thus, the second drive motor may drive the lead screw to rotate, and the rotating lead screw drives the slide seat to move up and down to drive the display screen 40 to rotate.

Referring to FIGS. 3, 5 and 8, in an embodiment of the present disclosure, an outer circumferential surface of the loudspeaker body 20 is concaved to form a second installation space 29, and the second driver 50 is disposed in the second installation space 29. The display screen 40 is connected to a connecting rod 41, and one end of the connecting rod 41 away from the display screen 40 extends into the second installation space 29 to connect with the second driver 50.

It can be understood that the second installation space 29 provides an accommodation space for the second driver 50, through which the second installation space 29 may accommodate the second driver 50. Thus, the second driver 50 may be installed more compactly on the loudspeaker body 20, which facilitates further reduction of the overall volume of the loudspeaker. Meanwhile, the second driver 50 may be isolated and protected by the second installation space 29 so as to reduce the possibility of the second driver 50 being damaged by foreign objects, which facilitate extending the lifespan of the second driver 50. Here, when the loudspeaker body 20 includes a box 27 and a cover 28, the loudspeaker body 20 and the cover 28 enclose to form the second space, such that the second space may be formed after the box 27 and the cover 28 are respectively formed and assembled, which reduces the complexity of forming the second space. Specifically, the second space may include an upper segment 291 and a lower segment 293, the upper segment 291 is located on the box 27, and the box 27 and the cover 28 enclose to form the lower segment 293, and the lower segment 293 communicate with the upper segment 291. In this case, the second motor 51 of the second driver 50 is located in the lower segment 293, parts of the driving wheel 531 and the belt 535 of the transmission structure are also located in the lower segment 293, and the other parts of the driven wheel 533 and the belt 535 may be located in the upper segment 291. Of course, in other embodiments, the second space may be opened only on the box 27 of the loudspeaker body 20. Alternatively, the second driver 50 is directly disposed on an outer circumferential surface of the box 27. In addition, the display screen 40 is connected to the belt 535 by the connecting rod 41 such that there is a certain distance between the display screen 40 and the loudspeaker body 20, which can reduce the possibility of interference during installation of the display screen 40 and the loudspeaker body 20 or during up-and-down slide of the display screen 40, which facilitates improvement of the safety of installation and the safety of movement of the display screen 40. Here, the connecting rod 41 may has a linear shape, may also have an arc shape, or may also have a dog-leg line shape, etc. Further, the belt 535 may be disposed with an installation block, and the connecting rod 41 may be detachably connected to the installation block disposed on the belt 535. Thus, when the display screen 40 is damaged, it may be removed from the belt 535 for maintenance and replacement, which improves the convenience of maintenance and replacement. Here, the connecting rod 41 and the installation block disposed on the belt 535 may be connected by screws or fasteners to simplify the assembly and disassembly process of the connecting rod 41 and the installation block.

Referring to FIGS. 2, 3, 6 and 8, in an embodiment of the present disclosure, the loudspeaker also includes an inner casing 60. The inner casing 60 covers the loudspeaker body 20, The inner casing 60 is provided with an exposing hole 61 at a position corresponding to the installation hole 22 and is provided with a first avoiding hole 63 at a position corresponding to the second installation space 29. An outer circumferential surface of the inner casing 60 is also provided with a guide groove 65 at a position adjacent to the avoiding hole, and the guide groove 65 and the first avoiding hole 63 are opened and extended in the up and down direction. An end of the connecting rod 41 away from the display screen 40 extends into the second installation space 29 via the first avoiding hole 63. The connecting rod 41 is also provided with a guide block 411, and the guide block 411 is slidably inserted into the guide groove 65 in the up and down direction.

It can be understood that the speaker 23 may be further surrounded by the inner casing 60 to effectively reduce the impact of vibration and resonance on the smart speaker 23, which facilitates improvement of sound producing performance of the loudspeaker for a relatively better sound. Meanwhile, a guide groove 65 may be disposed on the inner casing 60, such that a guide block 411 may be disposed on the connecting rod 41 correspondingly. The fit of the guide block 411 and the guide groove 65 may guide the display screen 40 to slide up and down, which facilitate improvement of the sliding stability of the display screen 40 to accurately slide to a preset position. Here, an outer circumferential surface of the box 27 of the loudspeaker body 20 may be concaved to form the guide groove 65. Or, off course, the outer circumferential surface of the box 27 may be provided with an L-shaped block, and the L-shaped block and the outer circumferential surface of the box 27 enclose to form the guide groove 65 so as to avoid the overall wall thickness of the box 27 from being set relatively thick, which facilitates reduction of the manufacturing costs.

Referring to FIGS. 1, 2, 3, 6 and 8, in an embodiment of the present disclosure, the loudspeaker also includes an outer casing 70. The outer casing 70 includes a lower casing 71 and an upper casing 73, the lower casing 71 is provided with a lower cavity 711 with an opening upward, and the base 10 is disposed in the lower cavity 711. The upper casing 73 is provided with an upper cavity 731 with an opening downward, the upper casing 73 covers the inner casing 60, and a lower surface of the upper casing 73 abuts against an upper surface of the lower casing 71. The upper casing 73 is provided with a plurality of sound holes 733 at a position corresponding to the exposure hole and is provided with a second avoiding hole 735 at a position corresponding to the first avoiding hole 63. The second avoiding hole 735 is opened and extended in the up and down direction, and one end of the connecting rod 41 away from the display screen 40 extends into the first avoiding hole 63 via the second avoiding hole 735.

It can be understood that the speaker 23 may be further surrounded by the upper casing 73 to effectively reduce the impact of vibration and resonance on the smart speaker 23, which facilitates improvement of sound producing performance of the loudspeaker for a relatively better sound. Meanwhile, such a setting also avoids the direct exposure of the speaker 23, which can reduce the possibility of damage caused by foreign objects, thus facilitating extending the lifespan of the speaker 23. The lower casing 71 is disposed to accommodate the base 10. In this case, the lower casing 71 abuts against and is supported by the supporting surface, and thus, a contact area between the loudspeaker and the supporting surface may be increased, which facilitates further improvement of the stability of the placement of the loudspeaker. Meanwhile, the projection area of the lower casing 71 on the horizontal plane may be set the same as the projection area of the upper casing 73 on the horizontal plane, so that the outermost circumferential surface of the loudspeaker has consistency and aesthetics are ensured, thereby improving the competitiveness of the product in the market. Here, the projections of the upper casing 73 and the lower casing 71 on the horizontal plane may both have circular shapes to make their volumes relatively small, and after the casing 70 is rotated with the inner casing 60 and the loudspeaker body 20, it is still consistent with the outer circumferential surface of the lower casing. In order to make the upper cavity 731 of the upper casing 73 and the lower cavity 711 of the lower casing 71 relatively small, the projections of the base 10, the inner casing 60 and the loudspeaker body 20 on the horizontal plane can all have circular shapes. In addition, in order to further improve the stability of the rotations of the loudspeaker body 20 and the inner casing 60, a lower section of the inner casing 60 may extend into between the base 10 and a sidewall of the lower cavity 711. Meanwhile, the inner casing 60 may also abut against a side circumferential surface of the base 10 and a bottom wall of the lower cavity 711, such that the side circumferential surface of the base 10 may function to guide the rotation, and the bottom wall of the lower cavity 711 may function to support.

The present disclosure also provides an electronic system. The electronic system includes a loudspeaker, and the specific structure of the loudspeaker may refer to the above embodiments. As the electronic system adopts all the technical solutions of all the above embodiments, at least has all the beneficial effects originated from the technical solutions of the above embodiments and will not be repeated here. The electronic system may include a loudspeaker and a TV connected to the loudspeaker, or it may include a loudspeaker and a smart home appliance connected to the loudspeaker.

The above embodiments are only preferred embodiments of the present disclosure and are not intended to limit the patent scope of the present disclosure. Under the inventive concept of the present disclosure, equivalent structural transformations made using the description and drawings of the present disclosure or direct/indirect applications in other related technical fields, are included in the scope of patent protection of the present disclosure.

What is claimed is:

1. A loudspeaker comprising:
- a base;
- a loudspeaker body disposed on the base and defining an up and down direction of the loudspeaker, wherein the loudspeaker body is rotatable around the up and down direction with respect to the base; and
- a first driver configured to drive the loudspeaker body to rotate with respect to the base,
- wherein the loudspeaker further comprises a display screen slidably provided on the loudspeaker body in the up and down direction, and
- wherein the loudspeaker further comprises a second driver configured to drive the display screen to slide with respect to the loudspeaker body.

2. The loudspeaker according to claim 1, wherein the first driver comprises:
- a first motor disposed on the loudspeaker body;
- a driving gear inserted with an output shaft of the first motor; and
- a driven gear inserted with the base and engaged with the driving gear, wherein an axis of the driven gear coincides with a rotation axis of the loudspeaker body, and the first motor drives the driving gear to rotate with respect to the driven gear so as to drive the loudspeaker body to rotate with respect to the base.

3. The loudspeaker according to claim 2, wherein an installation tube is protruded from a surface of the base facing the loudspeaker body, and a projection of the installation tube to a projecting plane vertical to the up and down direction has a circular shape, and
- wherein a rotating shaft is protruded from a surface of the loudspeaker body facing the base, the rotating shaft is rotatably inserted into the installation tube, and the driven gear is inserted with the installation tube.

4. The loudspeaker according to claim 3, wherein a first installation space is formed in the loudspeaker body, and an extension hole connecting the first installation space is provided on the surface of the loudspeaker body facing the base, and
- wherein the first motor is disposed in the first installation space, and an output shaft of the first motor passes through the extension hole.

5. The loudspeaker according to claim 1, wherein the second driver comprises:
- a second motor disposed on the loudspeaker body; and
- a transmission structure transmissively connected to the second motor and the display screen, wherein the second motor drives the display screen to slide with respect to the loudspeaker body by the transmission structure.

6. The loudspeaker according to claim 1, wherein a second installation space is concavely formed on an outer circumferential surface of the loudspeaker body, and the second driver is disposed in the second installation space, and
- wherein the display screen is connected to a connecting rod having one end away from the display screen extending into the second installation space to be connected to the second driver.

7. The loudspeaker according to claim 6, wherein the loudspeaker body further has a sound cavity formed therein and an installation hole communicating with the sound cavity, and wherein the loudspeaker body is further provided with a speaker having a part extending into the sound cavity via the installation hole,
- wherein the loudspeaker further comprises an inner casing covering the loudspeaker body, wherein the inner casing has an exposing hole provided at a position corresponding to the installation hole, a first avoiding hole provided at a position corresponding to the second installation space, and a guide groove provided at a position of an outer circumferential surface of the inner casing adjacent to the avoiding hole, wherein the guide groove and the first avoiding hole are opened and extended in the up and down direction, and
- wherein the one end of the connecting rod away from the display screen extends into the second installation space via the first avoiding hole, and wherein the connecting rod further has a guide block slidably inserted into the guide groove in the up and down direction.

8. The loudspeaker according to claim 7, wherein the loudspeaker further comprises an outer casing comprising:
- a lower casing provided with a lower cavity having an opening upward, wherein the base is disposed in the lower cavity; and
- an upper casing provided with an upper cavity having an opening downward, wherein the upper casing covers the inner casing, and a lower surface of the upper casing is connected to an upper surface of the lower casing, and wherein the upper casing has a plurality of sound holes provided at a position thereof corresponding to the exposing hole, and a second avoiding hole provided at a position thereof corresponding to the first avoiding hole, wherein the second avoiding hole is opened and extended in the up and down direction, and the one end of the connecting rod away from the display screen extends into the first avoiding hole via the second avoiding hole.

9. An electronic system comprising a loudspeaker according to claim 1.

* * * * *